W. E. GREENAWALT.
METALLURGICAL PROCESS.
APPLICATION FILED NOV. 23, 1912. RENEWED JAN. 17, 1917.
1,218,177. Patented Mar. 6, 1917.
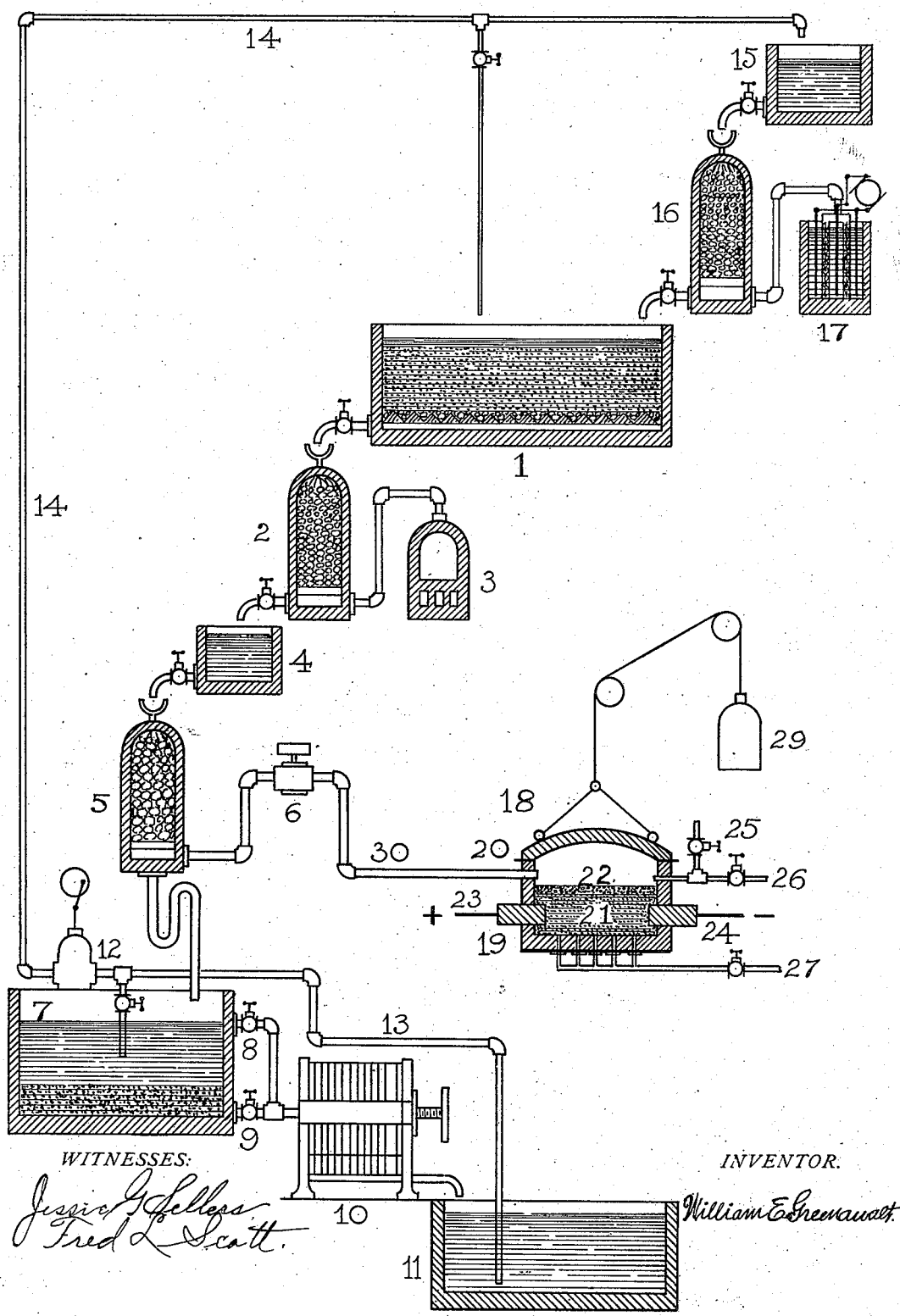

UNITED STATES PATENT OFFICE.

WILLIAM E. GREENAWALT, OF DENVER, COLORADO.

METALLURGICAL PROCESS.

1,218,177.      Specification of Letters Patent.      Patented Mar. 6, 1917.

Application filed November 23, 1912, Serial No. 733,201. Renewed January 17, 1917. Serial No. 142,964.

*To all whom it may concern:*

Be it known that I, WILLIAM E. GREENAWALT, a citizen of the United States, residing in the city and county of Denver and the State of Colorado, have invented certain new and useful Improvements in Metallurgical Processes, of which the following is a specification.

My invention relates to improvements in metallurgical processes and has for its more immediate object the cheap recover of copper from its ores with a simultaneous recovery of the sulfur combined with the copper when precipitated as the sulfid, although it is not intended to limit it to this use alone.

Hydrogen sulfid makes an excellent precipitate of copper from its solutions, for, not only is the copper precipitated, but an equivalent of acid is regenerated, and this regenerated acid solution may again be applied to the ore and thus the process may be made cyclic and the cost of extraction materially reduced.

The principal difficulties in the use of hydrogen sulfid have been the cost of producing it, and the conversion of the sulfid precipitate into metallic copper. It is purposed in this process to convert the copper into metal and recover the elemental sulfur or convert it direct into hydrogen sulfid for further precipitation, and thus make the precipitation of copper with hydrogen sulfid commercially applicable.

If copper sulfid is heated in an oxidizing atmosphere, as in a roasting or smelting furnace, or converted into blister copper by a bessemerizing process, the combined sulfur is eliminated as sulfur dioxid. If, on the contrary, it is heated in a reducing atmosphere and the temperature is raised sufficiently high, the copper sulfid is dissociated and the sulfur volatilized in its elemental form, and this sulfur, under suitable conditions, may be directly converted into hydrogen sulfid. A difficulty occurs, however, in heating the copper sulfid in a reducing atmosphere and get the conditions best adapted to the reactions. I have found that this can be done, under almost ideal conditions, by charging the copper sulfid into an electric furnace, where all the conditions can be maintained to get the best results both for the recovery of the copper and the generation of hydrogen sulfid or the recovery of the sulfur.

In charging the copper sulfid into the furnace and subjecting it to a temperature sufficiently high to dissociate the copper sulfid and volatilize the sulfur, it is preferably charged in a fused state, since the voluminous precipitate of copper sulfid is more readily charged after having been fused or during fusion. The copper sulfid, however, can be charged direct into the electric furnace and fused there either by the current, or otherwise before applying a temperature sufficiently high to dissociate it.

It is desirable to mix with the copper sulfid a certain amount of coal or other reducing agent, in addition to covering the charge with coal or coke. The idea being to maintain a reducing atmosphere and unnecessarily prevent the sulfur from being oxidized to sulfur dioxid. Other sulfids might answer the same purpose very well, but copper sulfid is the one more directly concerned in this process, and the application of other sulfids will be readily understood.

A complete description of the process, in its application to extracting and precipitating copper from its ores, its precipitation from the solution with hydrogen sulfid, and the method of treating the sulfid precipitate to recover the copper and volatilize the sulfur which may then be converted into hydrogen sulfid, is best described by referring to the accompanying drawing in which 1 represents a leaching vat agitator, or other receptacle for treating ores with a solution to dissolve the copper; and preferably with an acid chlorid solution. After the ore is sufficiently treated the solution, containing the copper mostly as cupric chlorid, is filtered from the gangue and treated with sulfur dioxid in the reducing tower 2, in which the solution is preferably subdivided to facilitate the reactions. The cupric chlorid is converted into the cuprous chlorid and acid regenerated according to the following equation:

(1)    $2CuCl_2 + SO_2 + 2H_2O =$
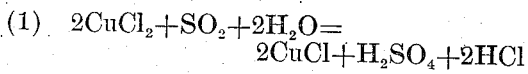
$2CuCl + H_2SO_4 + 2HCl$

From tower 2 the cuprous chlorid solution, now containing also an equivalent of free regenerated acid, flows into storage and regulating tank 4, and from there it is drawn in a continuous stream into the precipitating tower 5, where the copper is precipitated with hydrogen sulfid, preferably obtained from the apparatus 18. The reaction is:

(2) $2CuCl + H_2S = Cu_2S + 2HCl$ thus regenerating an additional equivalent of acid. Gold and silver, if present, are similarly precipitated. If an alkaline or sulfate solution is used to dissolve the copper, the application of sulfur dioxid in reducing tower 2 will usually be omitted, and the solution flowed directly from the leaching vat 1 to the precipitator 5. Ordinarily, however, the chlorid solution is to be preferred, for the reason that the gold and silver may be extracted with the copper, and the regeneration of the extra acid with sulfur dioxid, will materially cheapen the process.

From the precipitating tower 5, the precipitated solution now containing the precipitate in suspension, flows into settling tank 7, where the sulfid precipitate settles to the bottom and accumulates until its removal is desirable. If the supernatant and regenerated acid solution is free from suspended matter, as will be the case if sufficient time is allowed for it to settle, it may be pumped by means of pump 12 either directly back to the leaching vat or into the storage tank 15. It will usually be found better to filter the precipitate and regenerated solution, as through a filter press 10, when all suspended matter will be caught in the press, and the clear solution flowing into tank 11 may be pumped to tank 15 by means of the pump 12 and pipe line 14.

The regenerated solution in tank 15 will contain all its salts at their lowest valencies, and possibly also some hydrogen sulfid. In this condition it is not advisable to apply it to the ore, especially if any chemical reaction is desired from the salts in the solution with the copper in the ore. In order to make the solution most effective it is oxidized, or the valencies of the salts raised by applying air, chlorin, or other oxidizing agents to the solution in the oxidizing tower 16. If there is gold in the ore, or if free chlorin is desired in the solution to act on the silver, or for other purposes, it is preferably generated by electrolysis from common salt, in the electrolyzer 17, which may also represent an apparatus for producing oxidizing agents, such as ozone, etc.

The solution, now brought to its highest state of efficiency, is again returned to the ore to complete another cycle, and in this way the operation may be continued indefinitely.

From an acid solution hydrogen sulfid precipitates only the metals of the first and second analytical groups, so that the precipitate will always be reasonably pure no matter how impure the solution may be. If an alkaline solution is used, detrimental impurities will not be dissolved.

The precipitate accumulates in tank 7 until it is desirable to remove it. The acid is then drained as completely as possible, and the precipitate washed and filtered. It is then treated, preferably, as follows, largely with a view of re-using the sulfur either for the production of hydrogen sulfid or sulfur dioxid and to get the copper in its metallic condition.

The precipitate after being washed and filtered, and preferably fused as in a reverberatory furnace to make it more compact, is then charged, either solid or molten, into the electric furnace 18, where it can be heated to the desired temperature in a reducing atmosphere. The fine and voluminous precipitate might be charged direct into the electric furnace and good results obtained. In any case, a reducing agent, such as coal or coke, is charged with the copper sulfid, and may be covered with a layer of coke 22.

23 represents the positive, and 24 the negative electrode of the electric furnace 18. 19 represents the bottom portion of the furnace and 20 a removable top for charging the copper sulfid and for ladling out the molten copper. The bottom may contain perforations, as in an ordinary copper converter, through which reducing gases may be forced into the charge, if desired. When the current is turned on the charge is heated as desired. This may be done in a reducing atmosphere and without the necessity of introducing undesirable gases into the interior of the furnace, as in ordinary smelting operations. When the temperature is sufficiently high, say at a white heat, the copper sulfid is dissociated, probably by electrolytic action, and sulfur volatilized. While the sulfur is being volatilized, steam, and preferably reducing gases are introduced into the highly heated furnace, through the steam pipe 25 and the gas pipe 26, which combines with the sulfur to form hydrogen sulfid. Some hydrogen and other reducing gases may also be produced at the same time. The gas is exhausted from the furnace through pipe 30 by means of the exhauster 6, and forced into tower 5, to precipitate the copper from its solution. The coal or coke, charged with the copper sulfid, will tend to form reducing gases in the furnace, so that the introduction of steam alone at times may be quite sufficient. The steam introduced through pipe 25 may act as an injector to introduce the reducing gases from pipe 26, and both may be regulated as desired. The intimate association of the steam, sulfur, and reducing gases in the highly heated upper part of the furnace results in a high efficiency in the production of hydrogen sulfid.

If it is intended to make the process indirect, the sulfur may be volatilized and recovered as flowers of sulfur, and the sulfur so recovered may then be used as desired.

While the method of fusing the sulfid, before charging into the furnace, is preferred, it is quite feasible to charge the precipitate direct, either alone, or mixed with some reducing agent such as coal or coke. The electric current can then be used to bring it to incandescence and fusion, after which sufficient heat may be applied to dissociate the copper sulfid.

A decided advantage in treating the copper sulfid in this way instead of blowing it to blister copper by the converter process, is, that the sulfur may be recovered in useful form. The advantage of using the electric current to bring the sulfid to the high temperature necessary to effect dissociation, is, that this can readily be done in a reducing atmosphere, and thus the desired results may be better obtained.

The treatment of the sulfid precipitate, which is practically pure copper sulfid, differs from smelting, either with fuel or by means of the electric current, in that no flux is required and the copper sulfid may be dissociated by the electric current by heat alone, leaving practically pure copper. If a matte or copper sulfid ore is smelted to recover the metallic copper, air is required to oxidize the iron, and a flux, such as silica, to slag it. By simply dissociating the copper sulfid the metal is readily recovered and the sulfur is conveniently converted into a precipitant, and, in addition to precipitating more copper the precipitant renders its equivalent in acid for further solution of copper.

The volatilized sulfur may be used either as sulfur dioxid or hydrogen sulfid; if used as hydrogen sulfid it is perferably at once converted into the precipitant in the electric furnace. If used as sulfur dioxid it is preferably burned in the burner 3, and the gas conducted to tower 2.

Any volatile copper, such for example as the chlorid, from the electric furnace, is conducted with the precipitant into tower 5, and there recovered as the sulfid.

If the resulting metallic copper does not contain any precious metals worth recovering, it may at once be converted into a commercial brand of the metal; if it contains precious metals worth recovering, it may be electrolyzed in the ordinary way.

The application of sulfur dioxid to reduce the copper to the cuprous condition is a preferred arrangement; the hydrogen sulfid may be applied direct to the cupric chlorid solution, only more hydrogen sulfid will be required and less acid will be regenerated.

If it is necessary the ore is given, preferably, a chloridizing roast, and then leached with water or regenerated acid solution, the resulting cupric chlorid solution treated with sulfur dioxid and hydrogen sulfid, as described for oxidized ore, and the precipitated and regenerated acid solution returned to the ore to dissolve the copper not soluble in water. The same or similar result is obtained if the ore is given a sulfatizing or oxidizing roast. Whether the roast be oxidizing or sulfatizing, or chloridizing, the copper may be precipitated direct with hydrogen sulfid without the previous application of sulfur dioxid.

It is evident that by the cyclic use of the solvent, it will ultimately become charged with chlorids or sulfates, or both. The chlorids and sulfates form an effective combination to make the copper soluble if applied to the raw ore before roasting, consequently, when the solution becomes charged with soluble matter, the raw ore is saturated with it, and roasted. The chlorids acting with the sulfates, convert the copper into soluble chlorid or sulfate while the impurities themselves, such as iron chlorid or sulfate, become insoluble, as the oxid. In this way a given amount of salt or chlorin may be used cyclically and indefinitely, and thus save purchasing the salt for every furnace charge. When roasting is required, the copper made soluble by roasting, may furnish the basis for the regeneration of sufficient acid to extract the copper not made soluble in water by the roasting process.

For oxidized ores, roasting as a rule would not be necessary or desirable, but as most of the ores of copper are sulfids and have to be given a preliminary roast, the process offers a cheap and effective way of making the copper soluble. The soluble copper may then be precipitated and acid regenerated and the regenerated acid solution used to dissolve the copper as in oxidized ores. When the solution becomes charged with soluble matter it is applied to the raw ore, and the ore roasted, to make as much of the copper soluble in water as possible. The regenerated acid is also highly effective in making the copper soluble by roasting the ore with the soluble salts.

The solution charged with soluble matter may be evaporated and the salts mixed with the ore before roasting, but this may be considered as the equivalent of the application of the solution direct to the raw ore, since the water is evaporated from the ore before roasting can proceed.

I claim:

1. A metallurgical process which consists in fusing a sulfid precipitate, and then at an elevated temperature applying an electric current to separate the sulfur from the metal, and applying steam and reducing gases to the highly heated liberated sulfur to form hydrogen sulfid.

2. A metallurgical process which consists in fusing copper sulfid, and then at an elevated temperature applying an electric current to separate the sulfur from the metal, and applying steam in a reducing atmosphere to the highly heated sulfur to form hydrogen sulfid.

WILLIAM E. GREENAWALT.

Witnesses:
FRED L. SCOTT,
JESSIE G. SELLERS.